United States Patent [19]
Washi et al.

[11] Patent Number: 4,720,744
[45] Date of Patent: Jan. 19, 1988

[54] TELEVISION SYSTEM

[75] Inventors: Kazuro Washi; Masanori Oguino, both of Yokohama, Japan

[73] Assignee: Hitachi, Ltd., Japan

[21] Appl. No.: 597,745

[22] Filed: Apr. 6, 1984

[30] Foreign Application Priority Data

Apr. 7, 1983 [JP] Japan .................... 58-59938

[51] Int. Cl.[4] ............................. H04N 7/04
[52] U.S. Cl. .................... 358/141; 358/140
[58] Field of Search ........... 358/141, 214, 215, 140, 358/11, 12, 166, 152, 242, 54, 37, 160, 209

[56]         References Cited
       U.S. PATENT DOCUMENTS

| | | | |
|---|---|---|---|
| 4,310,856 | 1/1982 | Poetsch ................... | 358/214 |
| 4,364,090 | 12/1982 | Wendland ................ | 358/140 |
| 4,386,367 | 5/1983 | Peterson et al. ......... | 358/140 |
| 4,435,728 | 3/1984 | Raven et al. ............ | 358/140 |
| 4,539,592 | 9/1985 | Tanaka ................... | 358/140 |

FOREIGN PATENT DOCUMENTS

| | | | |
|---|---|---|---|
| 0004728 | 1/1977 | Japan .................... | 358/140 |
| 0004735 | 1/1977 | Japan .................... | 358/140 |
| 0079421 | 7/1978 | Japan . | |
| 0079390 | 5/1983 | Japan .................... | 358/160 |

OTHER PUBLICATIONS

Charge-Coupled Device (CCD) Camera/Memory Optimization for Expendable Autonomous Vehicles", by Roberts et al., Optical Engineering, vol. 21, No. 2, 4/82, pp. 354-358.

*Primary Examiner*—James J. Groody
*Assistant Examiner*—David E. Harvey
*Attorney, Agent, or Firm*—Antonelli, Terry & Wands

[57]            ABSTRACT

A television system employing the sequential scanning system wherein picture information obtained by sequential scanning at a scanning frequency twice that of the standard system in separated into the first field information consisting of odd-numbered lines and the second field information consisting of even-numbered lines, and the separated field informations are stored in respective memory devices. The first and second field informations stored in the memory devices are transmitted separately by a transmitter. The first and second field informations received by the reception system are stored in separate memory devices. The first and second field informations are read out from the memory devices in the order of the odd-numbered line and then the even-numbered line at a speed twice the writing speed, and the read-out line information is displayed on a display device which scans sequentially the screen at a scanning frequency twice that of the standard system.

4 Claims, 20 Drawing Figures

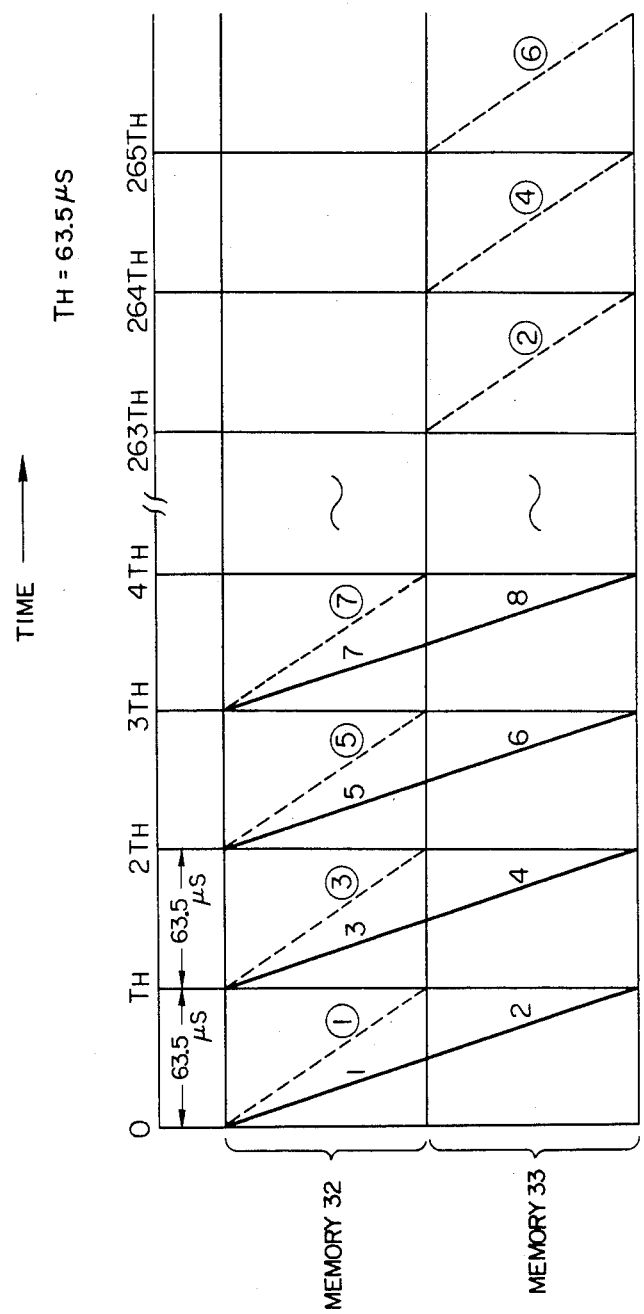

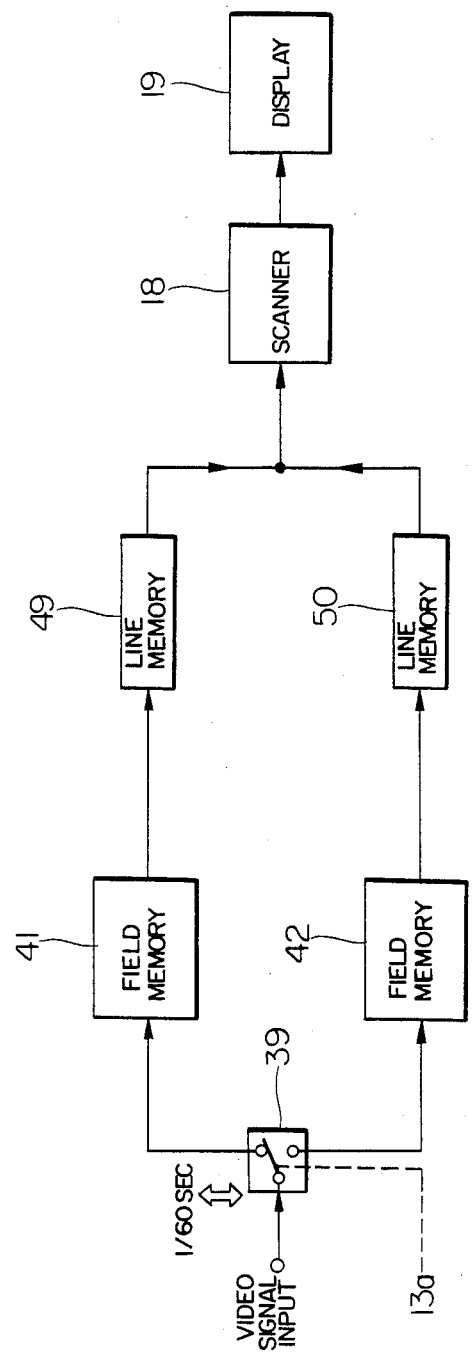

| ORDER OF SCANNING LINE NUMBERS AT IMAGE SENSING DEVICE | 1, 2, 3, 4, 5, 6 ------ 525, 1, 2, 3, 4 ---- |
| --- | --- |
| ORDER OF SCANNING LINE NUMBERS AT TRANSMITTER | 1, 3, 5, 7, 9, 11 ------ 525, 2, 4 -- 524, 1, 3, 5, 7 ---- |
| PHASE OF SUB-CARRIER (+:POSITIVE / −:NEGATIVE) | + − − + + − − + + − |

TELEVISION SYSTEM

The present invention relates to a television system and, particularly, to the improvement of the television system set forth in Japanese Patent Application No. 57-163947 filed on Sept. 22, 1982 by the inventors of the present invention and another coinventor, Miyuki Ikeda, and laid-open on Mar. 29, 1984, with laid-open No. 59-54394.

The currently prevailing television systems employ interlaced scanning. The interlaced scanning television systems have common drawbacks including: (1) the scanning lines take on a coarse appearance due to the crawling phenomenon, (2) the vertical resolution is impaired when displaying a moving image, and (3) flicker occurs at the edges of a high contrast picture. These problems are caused by interlaced scanning, and the television system of the above-mentioned Japanese Patent Application No. 57-163947 employs non-interlaced scanning, i.e., sequential scanning, in order to eliminate the problems caused by interlaced scanning. The present invention contemplates to improve the television system of this preceding invention, which will first be described prior to the detailed description of the present invention.

FIG. 1A is a block diagram showing the television transmission system disclosed in Japanese Patent Application No. 57-163947, and FIG. 1B is a block diagram showing the reception system. In FIG. 1A, the transmission system consists of a TV camera K including an image sensing device 2 adapted to shoot an object 1, signal selection switches 3 and 4 which reverse the state automatically at each frame interval, frame memories 5 and 6, a transmitter 8, and an antenna 9. The system operates at a horizontal scanning frequency ($f_H$) of 15.75 kHz, 525 scanning lines per frame, and a frame frequency of 30 Hz as in the case of the conventional standard television system, but the image sensing device 2 scans the imaged object in non-interlacing mode in this case. The image signals produced by sequential scanning are stored in the frame memories 5 and 6 alternately by operating the switch 3 at every change of frame. Each frame memory has a capacity to store picture information for one frame. The following gives an example of writing signals for the n-th frame into the memory at time t=0. At t=0, the switch 3 is assumed to be set to the side of the frame memory 5. Signals of the n-th frame in synchronism with the scanning operation of the image sensing devices are written into the frame memory 5 during the period of $0 \leq t < 2/60$ (sec). At t=2/60 (sec), the switch 3 is turned to the side of the frame memory 6 and, at the same time, the switch 4 is set to the side of the frame memory 5. Signals of the n+1th frame in synchronism with the scanning operation of the image sensor is written into the frame memory 6 during the period of $2/60 \leq t < 4/60$ (sec), while at the same time, odd-numbered horizontal scanning line information out of the contents of the frame memory 5 storing signals of the n-th frame is read out as the first field information during the period of $2/60 \leq t < 3/60$ (sec) and then even-numbered horizontal scanning line information is read out as the second field information during the period of $3/60 \leq t < 4/60$ (sec). These operations are repeated alternately.

A special discrimination code is inserted in the vertical retrace period of the signal carrying the field information when the signal is read out of the memory 5 or 6, so that the first field and second field of one frame can be distinguished by the receiver. One form of the field discrimination signal is shown in FIGS. 2A and 2B. FIG. 2A shows the signal of the first field, in which an additional field discrimination pulse with a duration of 1H (1H=63.5 $\mu$s) is inserted at the 10H-th time point counted from the beginning of the vertical retrace suppression period. FIG. 2B shows the signal of the second field, in which no pulse is inserted at the 10H-th time point from the beginning of the vertical blanking period. After the field signal has been processed as described above, it is encoded to form the luminance signal and chrominance signal by encoders (not shown) in accordance with the conventional color television system, and sent out through the transmitter 8 and antenna 9.

Next, the receiver of the television system disclosed in the above-mentioned preceding Japanese patent application will be described with reference to FIG. 1B. The arrangement includes an antenna 10, a tuner 11, a field pair discriminator 13 for determining a pair of fields, switches 14 and 15 which reverse the state automatically at each change of frame, frame memories 16 and 17, a double-rate scanner 18 operating at a horizontal scanning frequency of 31.5 kHz ($2f_H$), and a display 19.

The receiver operates to process the signal quite oppositely to the process of the transmitter. In FIG. 1B, the signal sent from the transmitter is received by the antenna 10, detected by the tuner 11, and then demodulated into the luminance signal (Y) and the differential color signals (R−Y and B−Y) by a demodulator (not shown). The field pair discriminator 13 detects the discrimination code in the demodulated signal to find a pair of fields which form a complete frame, and writes the signals of the fields into the frame memories 16 and 17. The switch 14 operates synchronously with the field pair discriminator 13.

The following describes the operation of receiving the n-th frame and writing signals of the n-th frame into the frame memories in a period starting at t=0. At t=0, if the field pair discriminator 13 determines that the received signals are of the first field, the switch 14 is set to the side of the frame memory 16. When the receiver has failed to receive the first field, but has received the second field at the beginning, the receiver operates to start writing from the first field of the next frame. The first field of the n-th frame is written in the addresses for the odd-numbered scanning lines in the frame memory 16 during the period of $0 \leq t < 1/60$ (sec), while the second field is written in the addresses for the even-numbered scanning lines in the frame memory 16 during the period of $1/60 \leq t < 2/60$ (sec). At t=2/60 sec when the switch 14 is turned to the side of the frame memory 17, the switch 15 is turned to the side of the frame memory 16. Thereafter, the first field of the subsequent n+1 th frame is written in the odd-numbered line addresses in the frame memory 17 during the period of $2/60 \leq t < 3/60$ (sec), and the second field is written in the even-numbered line addresses in the frame memory 17 during the period of $3/60 \leq t < 4/60$ (sec). In parallel to these processes during the period of $2/60 \leq t < 4/60$ (sec), the contents of the frame memory 16 are read out to the double-rate scanner 18 once each 1/60 second period so as to be read out twice in a period of 2/60 seconds. These operations are repeated alternately.

The read-out signals are displayed on 525 scanning lines on the display 19 at a frame frequency of 60 Hz in a non-interlacing mode.

One example of the field discrimination signal detecting circuit will be described with reference to the block diagram of FIG. 3. The circuit arrangement includes a vertical sync pulse input terminal 20, a video signal input terminal 21, a monostable multivibrator 22, a resistor 23, a capacitor 24, a logic level comparator 25, an AND gate 26, and a discrimination signal output terminal 27.

FIG. 4 is a set of timing charts for the signals observed at various portions of the field discrimination signal detecting circuit shown in FIG. 3. The operation of the circuit will be described with reference to FIGS. 3 and 4. A vertical sync (synchronizing) pulse is produced from the vertical sync signal in the video signal by a circuit not shown in the figure. The monostable multivibrator 22 in FIG. 3 responds to the rising edge of the vertical sync pulse received at the input terminal 20 and provides an output pulse with a duration of 7H–15H (1H=63.5 μs). The monostable multivibrator 22 has a relaxed condition of the output pulse width in the range between 7H and 15H, and it is advantageously rid of consideration in the temperature dependent variation of the output pulse width. The monostable multivibrator output is applied to one input of the AND gate 26, while the video signal received at the input terminal 21 is integrated by the connection of the resistor 23 and capacitor 24 and the integrated signal is fed through the level converter 25 to another input of the AND gate 26, so that the field discrimination signal is detected as a logical product of both input signals at the output terminal 27.

The foregoing television system disclosed in Japanese Patent Application No. 57-163947 employing noninterlaced scanning system contributes greatly to the improvement of picture quality such as alleviation of noticeable scanning lines caused by the crawling phenomenon, alleviation of the degraded vertical resolution in displaying a moving image, and alleviation of edge flicker. On the other hand, however, this system has the following problems which need to be improved. First, the system uses as many as four frame memories in the transmission and reception systems for processing the video signal, and this requires a large memory capacity in the overall system, resulting in an increased manufacturing cost. Second, the picture is displayed on the receiver with a time lag relative to the audio signal. This time lag is equal to the time for scanning two frames, and this forces an unnatural feeling on the viewers. The third problem is that the reproduction of a motion-picture film in the conventional 2-3 pull-down system results in a deteriorated picture quality due to a reason to be described later.

The first problem seems to be recognized without further explanation, and the second and third problems will be described in detail. The following first describes the second problem. In the transmitter shown in FIG. 1A, the frame memory starts to store the n-th frame of the television signal at t=0 (sec). The audio signal for the n-th frame is transmitted at a time within the range $0 \leq t < 1/30$ (sec). The transmitted audio signal is made audible in the receiver with a time lag caused by the transmission system and the receiver circuit. This time lag is small enough to neglect. On the other hand the video signal for the n-th frame is written in the frame memory 5 at time t within the range $0 \leq t < 1/30$ (sec). Then, at time t within the range $1/30 \leq t < 2/30$ (sec) when the video signal for the (n+1)-th frame is written into the memory 6, the contents of the frame memory 5 are read out and transmitted through the antenna 9.

In the receiver shown in FIG. 1B, the n-th frame signal is received and written into the frame memory 16 at time t within the range $1/30 \leq t < 2/30$ (sec). Then, at time t within the range $2/30 \leq t < 3/30$ (sec), the (n+1)-th frame signal is written into the memory 17 and, at the same time, the n-th frame signal is read out of the frame memory 16 and displayed on the display 19.

As can be seen from the above explanation, the video signal lags from the audio signal by 2/30 sec, i.e., two frame periods, inducing an unnatural feeling for the viewers.

Next, the third problem of impaired picture quality of a moving image in reproducing a motion-picture film in the 2-3 pull-down system will be described. First, the 2-3 pull-down system which has been used conventionally will be explained. When a motion-picture film of 24 frames/sec is projected using an ordinary projector, and the pictures are scanned by a television camera at the rate of 30 frames/sec (60 fields/sec), the difference of frame frequency, i.e., the difference between the shutter period of the projector and the scanning period of the television camera, causes an unacceptably severe flicker or vertically moving stripes (shutter bars) to appear on the display of the television receiver. Therefore, film projectors providing pictures for the television camera employ special film drive systems, which include an intermittent film scanning system and a continuous film scanning system. The intermittent film scanning system is further divided into a constant interval pull-down system and 2-3 pull-down system. The constant film scanning system includes a rotary mirror system and rotary prism system, but these systems are not concerned with the present invention and will not be described here.

The intermittent film scanning system is the system in which the film is fed intermittently and the light is irradiated to a frame of the film when it stops at the aperture, then the optical image formed on the image pickup tube is converted into the electrical signal. FIG. 5 shows the timing relationship between the 2-3 pull-down projection of the intermittent film scanning system and the scanning operation of the television system. In the figure, four frames 1F–4F of film are fed in 1/6 second, while ten fields 1T–10T (five frames) are scanned in the television system. The frames of movie film are projected to the television camera during periods shown by S1–S10.

Since the movie film is fed at 24 frames/sec and the display rate of television picture is at 60 fields/sec, the ratio of the numbers of pictures per unit time is 24:60=2:5, i.e., two frames of film correspond to five fields of television signal. On this account, the first frame of film is fed during a period of two fields of television signal and the second frame is fed during a period of three fields, instead of running the film at a constant frame rate. That is, the first frame 1F is projected twice (S1 and S2) and the next frame 2F is projected three times (S3, S4 and S5), while the television camera produces the picture signal for one field at each projection. This is a 2-3 pull-down projection operation method.

FIG. 6 shows the timing relationship between the 2-3 pull-down projection for a motion-picture film and the scanning operation of the television system set forth in Japanese Patent Application No. 57-163974. As can be seen from the figure, frame 1M of the television signal has the contents of frame 1F of the film projected during period S1, and frame 2M has the contents of frame 2F projected during period S2. The next frame 3M has the contents of the same frame 2F projected during period S3, and thus the frames 2M and 3M have the same contents. That is, one frame of film is transferred to two consecutive frames of television signal, and when the signal is displayed at the conventional frame rate of 30 Hz, the profile of a moving image appears to be unnatural, and it is evaluated as having a degraded picture quality.

As described above, the television system disclosed in Japanese Patent Application No. 57-163974 provides an enhanced picture quality as compared with the conventional interlaced scanning system, but involves the foregoing three problems: (1) the requirement of a large memory capacity, (2) time lag of the video signal from the audio signal, and (3) degraded picture quality in reproducing a motion-picture film in a 2-3 pull-down system.

The present invention is directed to solve the problems of the television system set forth in the above-mentioned Japanese Patent Application.

Accordingly, it is an object of the present invention to provide an improved television system which is not only superior in the picture quality as compared to the conventional interlaced scanning system, but also significantly reduces the memory capacity needed, virtually eliminates the time lag of picture from sound, and displays pictures without unnatural appearance in reproducing a motion-picture film in a 2-3 pull-down system, as compared with the television system set forth in the above-mentioned preceding Japanese Application.

In order to achieve these objectives, the television signal transmission system according to the present invention employs the following system. The horizontal scanning frequency is $2f_H = 31.5$ KHz, twice that of the conventional standard system, the number of scanning lines per frame is 525, and the frame rate is 60 Hz, twice that of the conventional standard system. One frame is scanned in a period of 1/60 second in non-interlaced scanning mode, and in the next 1/60 second period no scanning takes place or signals produced by scanning are not used. Among one-frame of information detected in the first 1/60 second scanning period, odd-numbered line information is stored as the first field information and even-numbered line informations are stored as the second field information. The first field information (for odd-numbered lines) had added thereto at its top a frame completion identification signal (the signal inserted in the vertical blanking period of the first field for indicating that this field and the next field form a complete frame), and after it has been stored temporarily in the line memory (the memory having a capacity for storing information of one scanning line), it is read out at a speed half that of the writing speed. The second field information (for even-numbered lines) is stored temporarily in the field memory (the memory having a capacity for storing information of one field), and after the first field information has been read out, it is read out during a 1/60 second period at a speed half that of the writing speed. Then, the signal is transmitted through the transmitter and antenna.

On the other hand, the television receiver of the inventive system has two field memories for temporarily storing received picture information. The two field memories each have written therein a complete frame during a period of 1/30 second, and the contents are read out at a line read-out frequency of $2f_H$ (15.75 kHz×2), twice that of the system of the above-mentioned preceding Japanese Application, so that the same frame is read out twice during the 1/30 second period. Then, the read-out signals are displayed on 525 scanning lines at a frame rate of 60 Hz in non-interlaced scanning mode.

The present invention will be more apparent the following detailed description taken in conjunction with the accompanying drawings, in which:

FIG. 9 is a diagram used to explain the same timing relationship in more detail;

FIGS. 10A, 10B and 10C are block diagrams showing separate embodiments of the television reception system according to the present invention;

Embodiments of the present invention will now be described with reference to the drawings.

Figure 7:
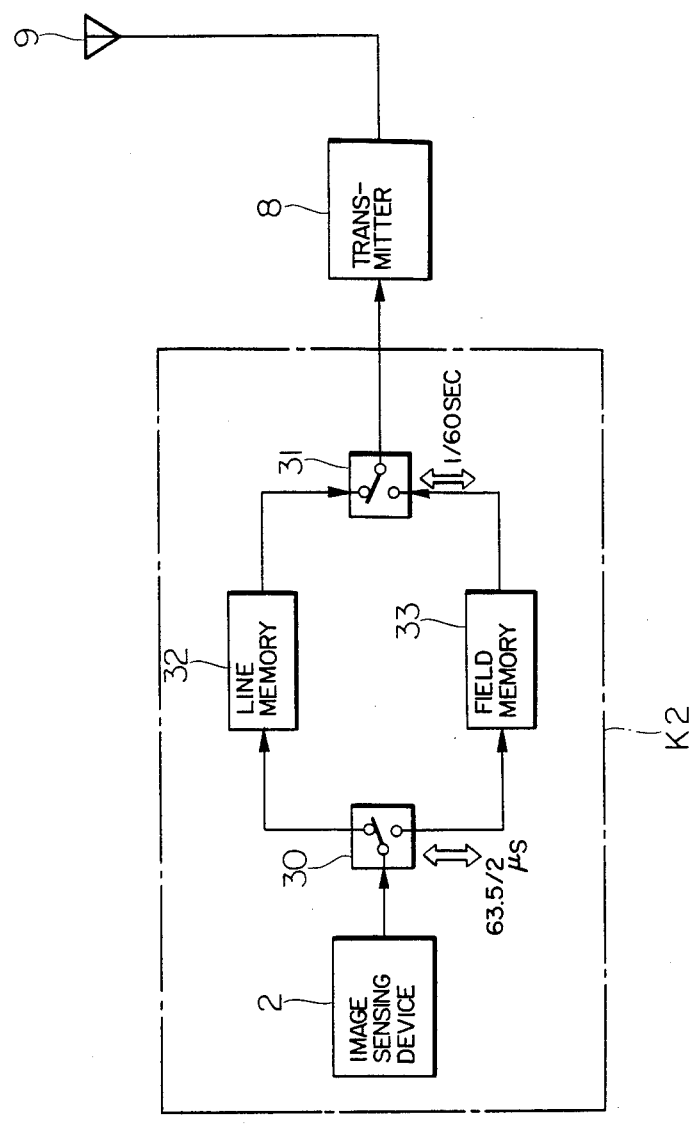
FIG. 7 is a block diagram showing one embodiment of the television transmission system according to the present invention.

In FIG. 7 showing one embodiment of the inventive television transmission system, the arrangement includes a double-rate scanning image sensing device 2 adapted to shoot an object 1, a signal selection switch 30 which reverses the state at the 63.5/2 μs interval in synchronism with the scanning operation, a switch 31 which reverses the state at the 1/60 sec interval (period of field), a line memory 32, a field memory 33, a television signal transmitter 8, a television signal transmission antenna 9, and a double-rate scanning television camera K2.

Figure 8:
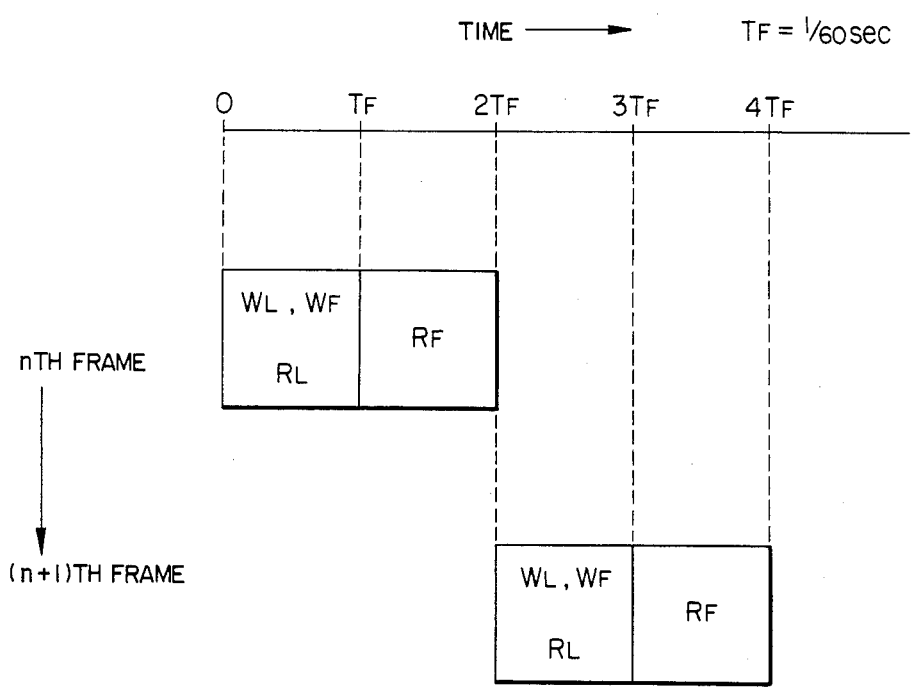
FIG. 8 is a diagram used to explain broadly the timing of access to the line memory and field memory in the arrangement of FIG. 7.

FIG. 8 shows the timing of access to the line memory and field memory for transacting field information, with the ordinate representing the frame number and the abscissa representing time. Symbol $W_L$ indicates the write operation of the line memory 32, $W_F$ indicates the write operation of the field memory 33, $R_L$ indicates the read operation of the line memory 32, and $R_F$ indicates the read operation of the field memory 33.

The operation will first be described broadly with reference to FIGS. 7 and 8. It is assumed expediently that the operation starts to scan the n-th frame at time point t=0 (sec). At time t within the range $0 \leq t < 1/60$ (sec), the double-rate scanning image sensing device 2 shoots the object 1. Among the n-th frame information scanned on the image pickup tube, the odd-numbered line information is stored in the line memory 32 in 63.5/2 μs per line and it is read out immediately in 63.5 μs. These write and read operations are repeated. At the same time, the even-numbered line information is written in the field memory 33.

At time t within the range $1/60 \leq t < 2/60$ (sec), nothing is written in the memories 32 and 33, but the even-numbered line information which has been written in the time range $0 \leq t < 1/60$ (sec) is read out. The same operations take place for the (n+1)-th frame, and following frames.

The operation will be described in more detail with reference to FIG. 9. In FIG. 9, a solid diagonal line across memory areas indicate writing of line information to the memories, with numbers appended to the solid line indicating the line numbers of the line information. A dashed diagonal line across a memory area indicates reading of line information from the memory, with appended number enclosed in the circle indicating the line number of the line information.

The operation will be described from the beginning at t=0 (sec) when the n-th frame is first scanned. At time t within the range $0 \leq t < 1/60$ (sec), the double-rate scanning image sensing device 2 shoots the object 1. The n-th frame information scanned on the image pickup tube is alternately divided by the switch 30 at a 63.5/2 μs interval and written in the line memory 32 and field memory 33. The odd-numbered line information written to the line memory 32 in 63.5/2 μs per line is read out immediately in 63.5 μs. The time difference between writing and reading is so small that these operations can be considered to be simultaneous. The even-numbered line information is selected by the switch 30 and written to the field memory 33 in 63.5/2 μs per line, and at time t within the range $1/60 \leq t < 2/60$ (sec), it is read out in 63.5 μs per line. The switch 31 reverses the state at the interval of field so that it selects the line memory 32 at time t within the range $0 \leq t < 1/60$ (sec) for reading out the first field, and selects the field memory 33 at time t within the range $1/60 \leq t < 2/60$ (sec) for reading out the second field. These operations are repeated. The television signal produced as described above is transmitted through the transmitter 8 and antenna 9.

The key feature of the inventive transmission system is the achievement of time extension for the transmission signal by using a single line memory, and this contributes to the significant reduction in the memory capacity. As mentioned previously, of a frame of picture scanned in a 1/60 sec period, the odd lines and even lines are written temporarily in the line memory 32 and field memory 33, respectively, and then read out immediately. The arrangement requires the memory capacity as small as about a quarter that needed by the system of the above-mentioned preceding Japanese patent application for accomplishing the same function. Moreover, this system transmits the same 2:1 interlaced signal as the of the currently operated television broadcasting system, allowing the conventional television receivers to receive the signal.

Figure 1A:
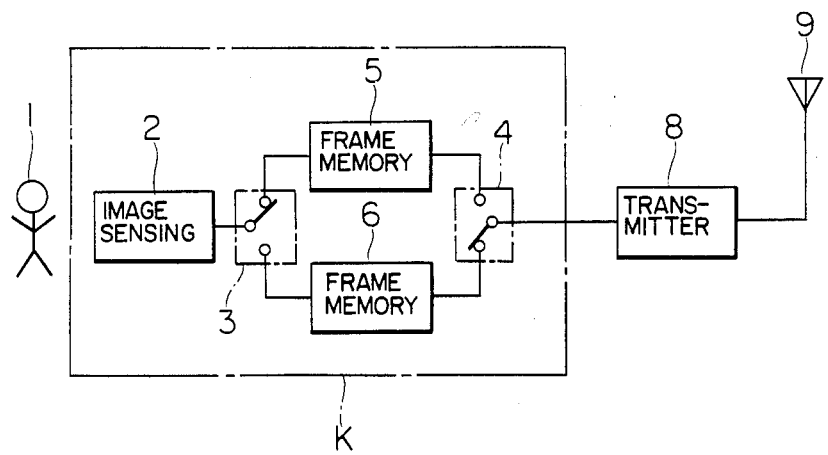
FIG. 1A is a block diagram showing the television transmission system set forth in Japanese Patent Application No. 57-163947.
Figure 1B:
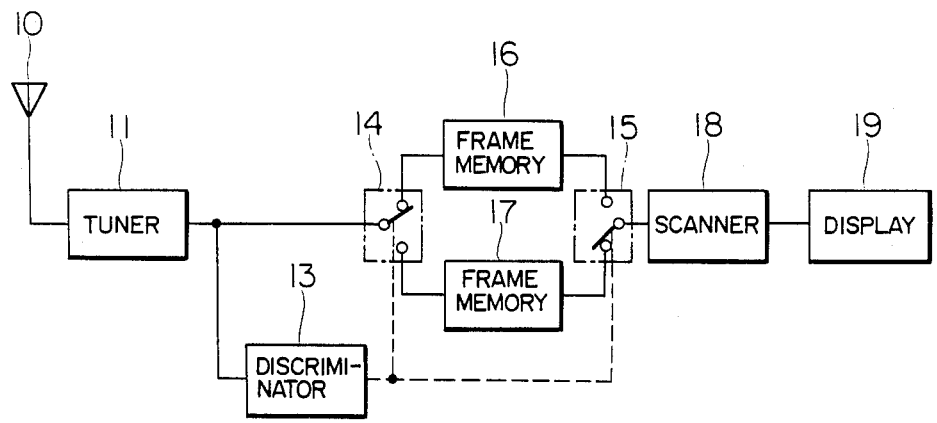
FIG. 1B is a block diagram showing the reception system of the same television system.
Figure 2A:
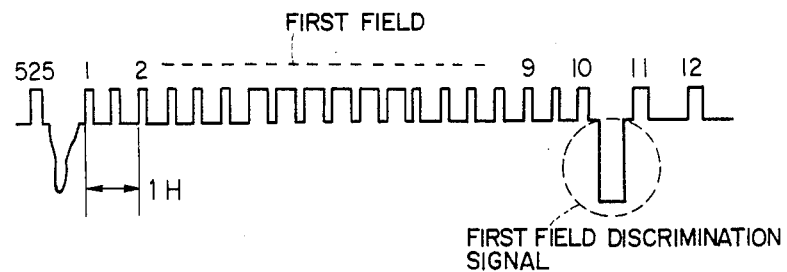
FIGS. 2A and 2B are waveform diagrams showing one example of the form of the field discrimination signal.
Figure 2B:
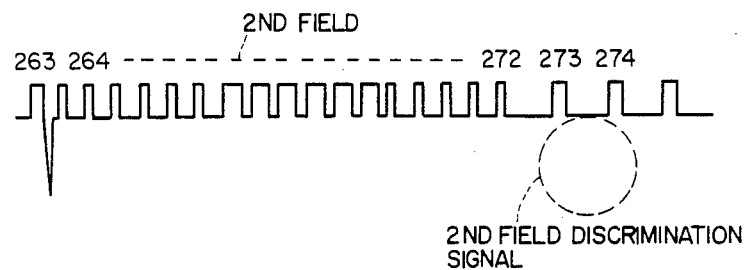
Figure 10A:
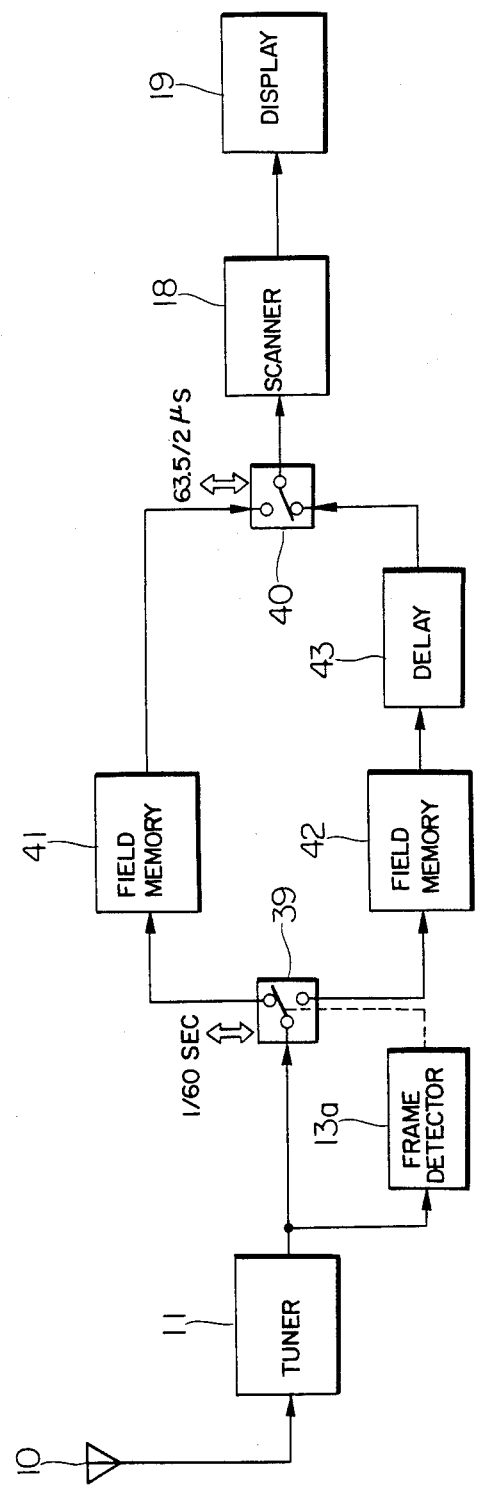

FIG. 10A shows in a block diagram an embodiment of the inventive television reception system. The arrangement includes a television signal receiving antenna 10, a television tuner 11, a detector 13a for detecting the frame completion identification signal (actually, the same circuit as the field pair discriminator 13 shown in FIG. 1B), a switch 39 for selecting field memory 41 in response to the presence of the frame completion identification signal (the first field identification signal shown by (a) in FIG. 2A) or selects field memory 42 in response to the absence of that identification signal, a switch 40 reversing the state in a 63.5/2 μs interval in synchronism with the frame completion signal, field memories 41 and 42, a delay circuit 43 for applying a delay of ½H (H=63.5 s) to the signal, a double-rate scanner 18 operating at a horizontal scanning frequency of $2f_H$ (15.75 kHz×2), and a display 19.

Figure 11A:
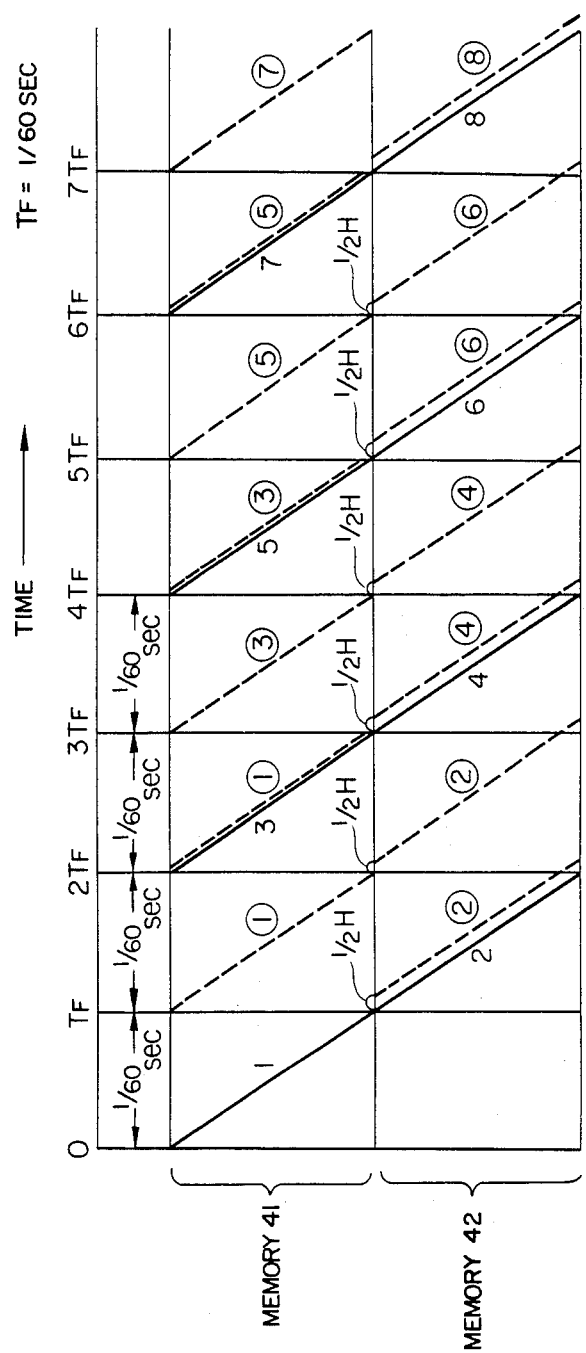
FIG. 11A is a diagram used to explain the timing of access to the two field memories in the arrangement of FIG. 10A.

FIG. 11A is a diagram showing, in the same fashion as for FIG. 9, the timing relationship in accessing the two field memories in FIG. 10A. The memory access operation will be described with reference to FIGS. 10A and 11A. Also in this case, the operation starts to receive the n-th frame at time t=0 (sec). The switch 39 selects the field memory 41 each time the frame completion identification signal is received and selects the field memory 42 in field periods when the identification signal is absent, so that the field memories revise their contents. Thus, a complete frame is stored in two field memories in the 1/30 sec ($2T_F$) period from t=0 (sec).

Figure 3:
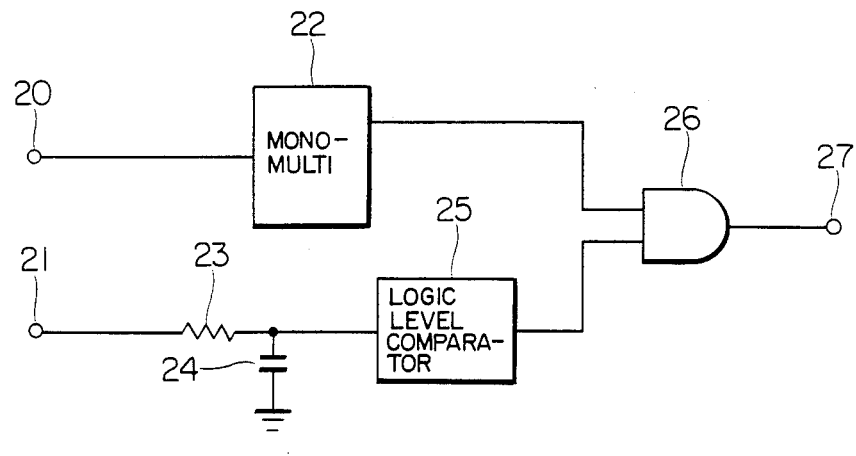
FIG. 3 is a block diagram showing one example of the field discrimination signal detection circuit.
Figure 4:
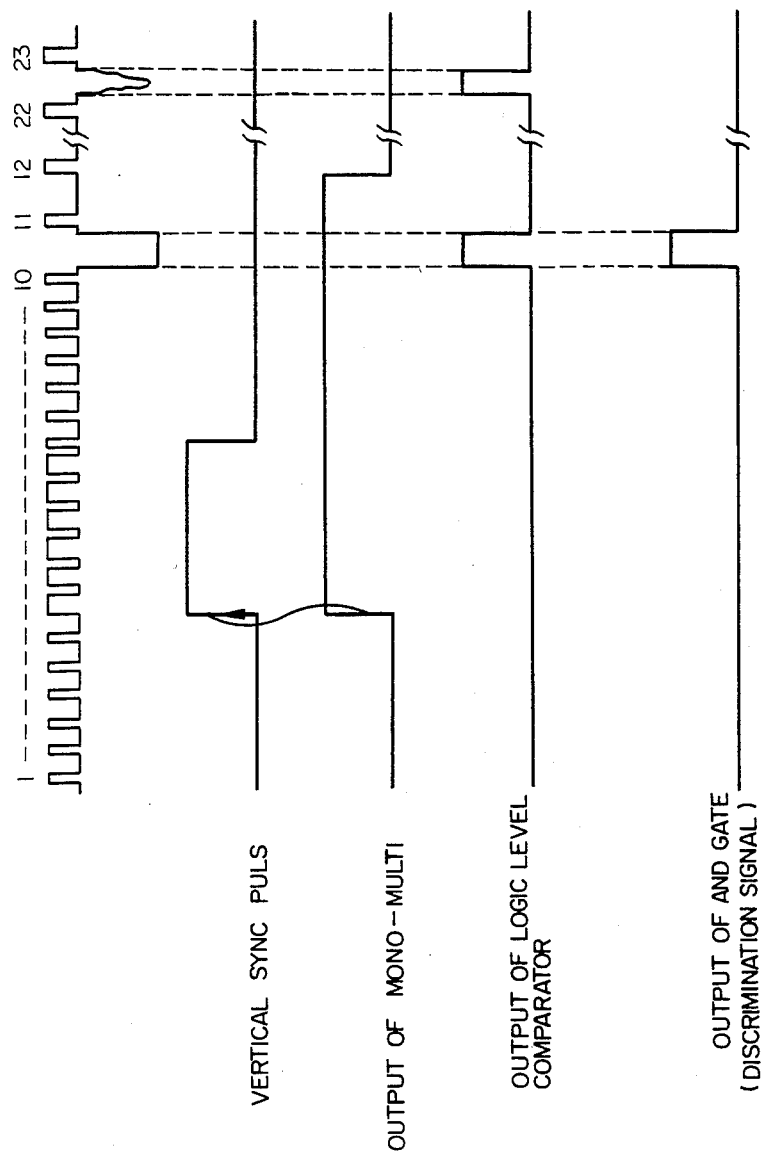
FIG. 4 is a set of timing charts showing the signals observed at various portions of the detection circuit shown in FIG. 3.
Figure 5:
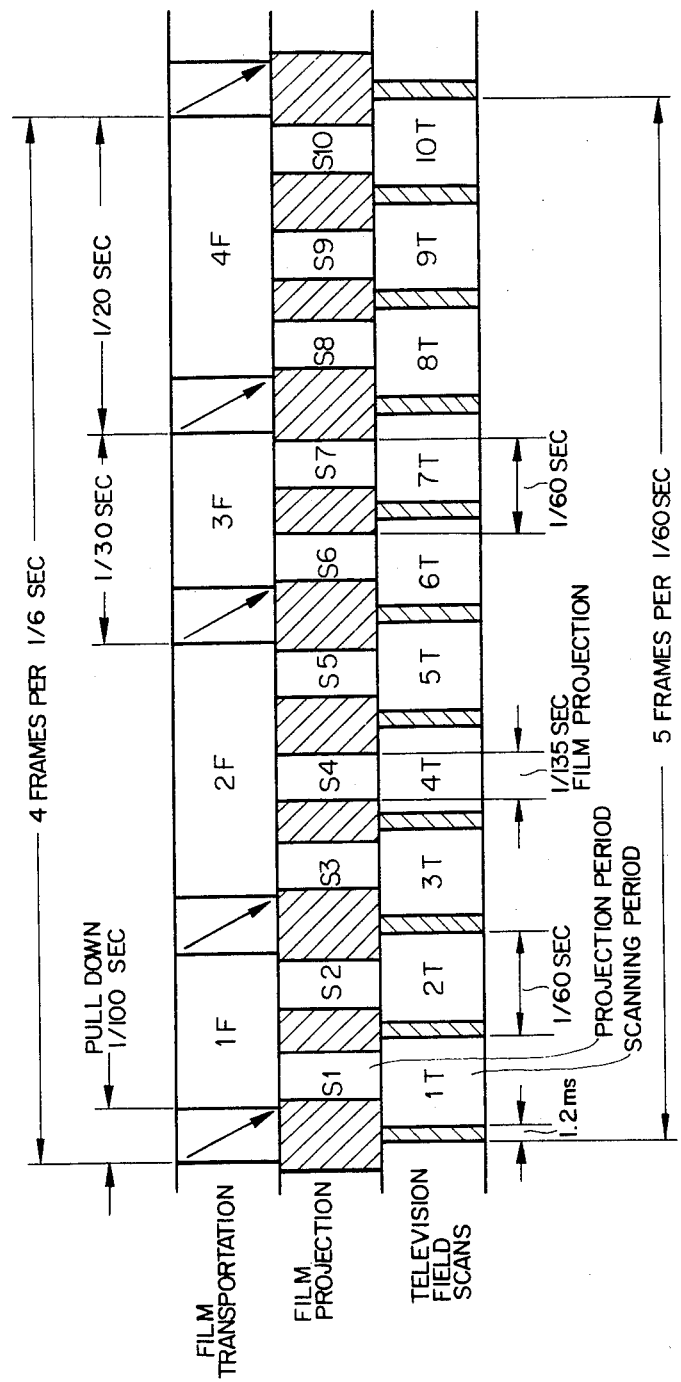
FIG. 5 is a diagram used to explain the timing relationship between the conventional 2-3 pull-down projection and the scanning operation in reproducing a motion-picture film.

If the receiver fails to receive the first field information of the n-th frame and starts receiving from the second field of the frame, the frame completion identification signal detector 13a operates on the memories to start writing from the first field information of the (n+1)-th frame. The detector 13a has the same circuit arrangement as that shown in FIG. 3 and explanation thereof will be omitted.

In FIG. 11A, the first field information of the n-th frame is written to the memory 41 at time t within the range $0 \leq t < 1/60$ (sec), i.e., in period $0$-$T_F$. At time t within the range $1/60 \leq t < 2/60$ (sec), i.e., in period $T_f$-$2T_F$, the second field information is written to the memory 42 and then read out immediately. At this time the second field information is fed through the delay circuit 43 which delays the signal by ½H, so that it is placed between adjacent lines of the first field information. At time t within the range $2/60 \leq t < 3/60$ (sec), i.e., in period $2T_F$-$3T_F$, the memory 41 reads out the first field information and writes the third field information. Also in this case, the second field information is fed through the delay circuit 43 so that it is placed between adjacent lines of the first field information. These operations are repeated.

Although the delay circuit has been assumed to have a delay of ½H for the purpose of clarifying the description, it may be arranged to have an arbitrary delay time ranging from ½H to one field period.

In consequence, by controlling the read/write operations by the switch, non-interlacing display on 525 scanning lines at a frame frequency of 60 Hz can be realized using two field memories and a delay circuit.

Figure 10B:
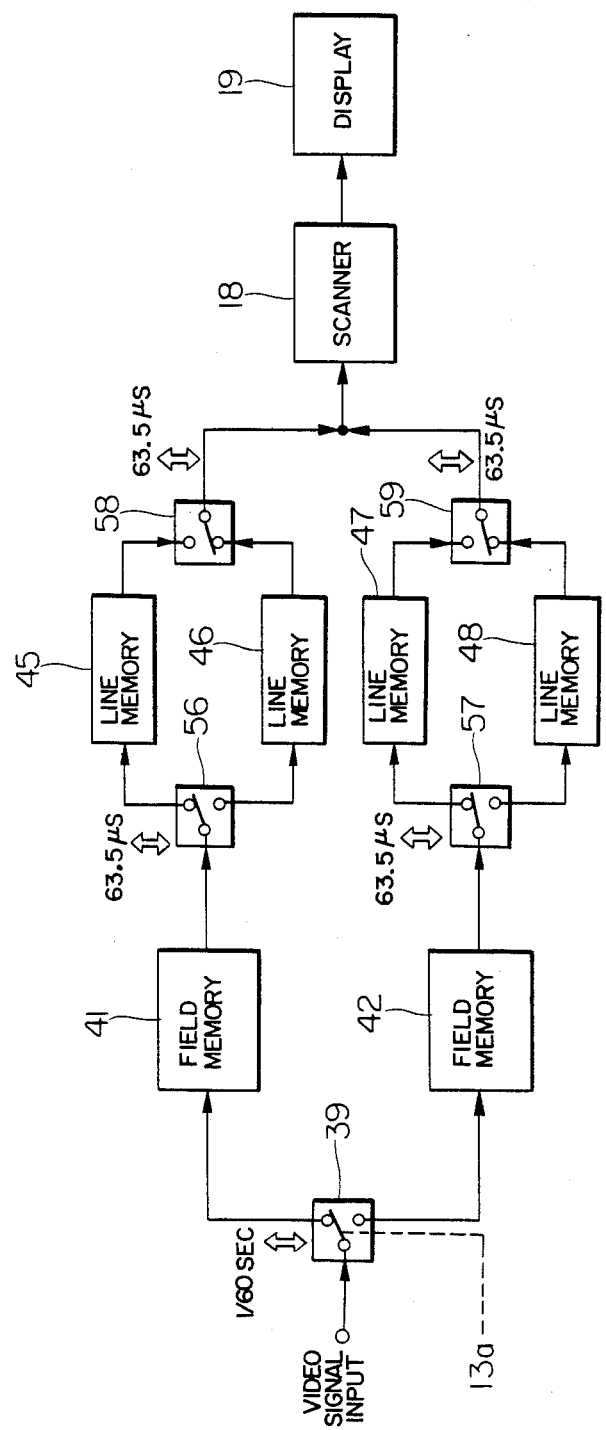

The following describes the second embodiment of the inventive reception system, in which four line memories are used in place of the delay circuit for the adjustment of timing for making access to the field memories and for time compression. In FIG. 10B showing in block diagram the second embodiment, the arrangement includes switches 56–59 which reverse the state at a 63.5 μs interval, i.e., at every 1-line information, in synchronism with the field information, line memories 45–48 which read information in 63.5 μs per line and read out in 63.5/2 μs per line to carry out non-interlaced display on 525 scanning lines twice in 1/30 second. This embodiment uses four line memories for the adjustment of timing of field memory access and for time compression, instead of using a delay circuit for the time adjustment for the field memory access (writing and reading) as described previously.

Figure 11B:
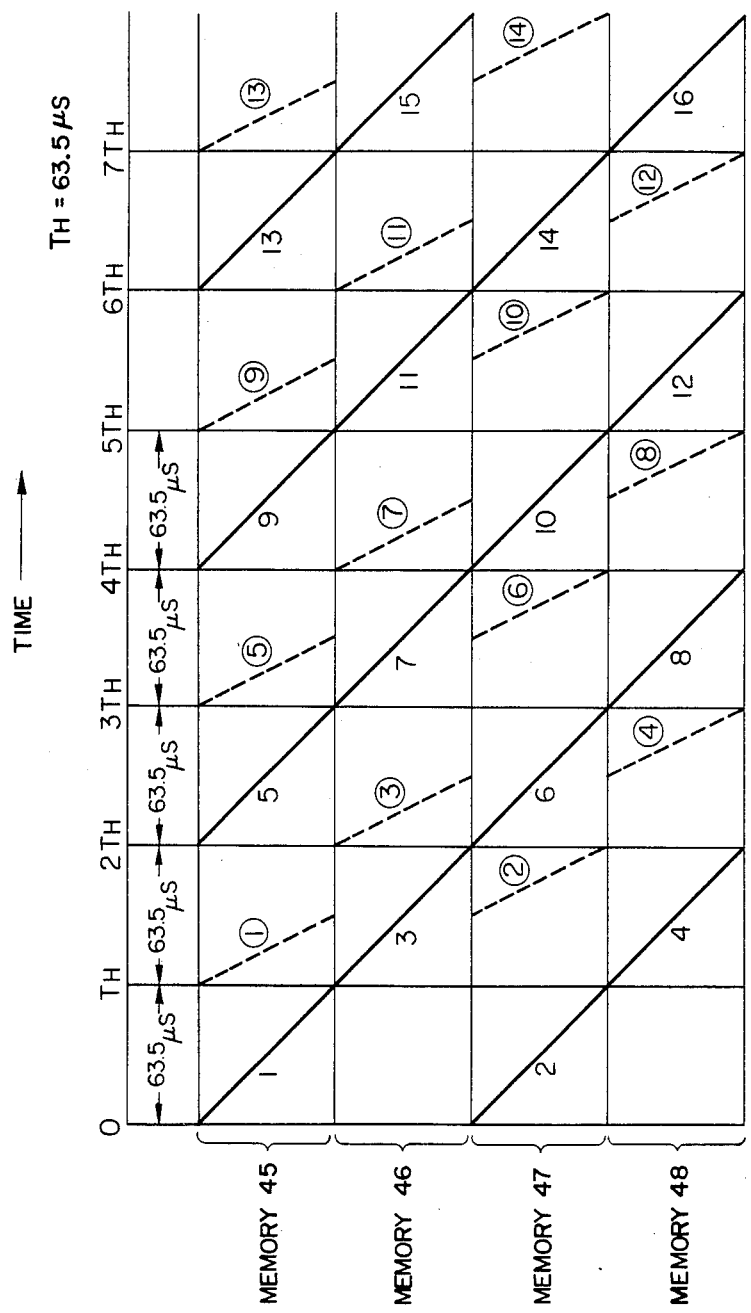
FIG. 11B is a diagram used to explain the timing of access to the line memories in the arrangement of FIG. 10B.

FIG. 11B shows the timing of access to the line memories in FIG. 10B. Starting at t=0, the first field information and second field information of the n-th frame are selected by the switch 39 at a 1/60 second interval and written into the field memories 41 and 42 alternately, as in the case of the first embodiment. The timing of reading out the field memories 41 and 42 to the line memories is identical to the case of the first embodiment shown in FIG. 11A, and the memory contents are read out as shown by the dashed lines in the figure. This read operation is shown in more detail in FIG. 11B. It should be noted that the time point t=0 of FIG. 11B corresponds to the time point $t=T_F$ in FIG. 11A.

The switches 56 and 57 reverse their state at a 63.5 μs interval and read out the odd-numbered line information in the field memory 41 into the line memories 45 and 46 alternately for each line. In the same way, the even-numbered line information stored in the field memory 42 is written into the line memories 47 and 48 alternately for each line.

As shown in FIG. 11B, the first through fourth line information which has been written in the memories 45–48 at time t within the range $0 \leq t < 2T_H (2 \times 63.5$ μs$)$ is read out sequentially at time t within the range ½H $(63.5/2$ μs$) \leq t < 2.5 T_H (158.75$ μs$)$ at a speed twice the writing speed. The operation is repeated as shown in the figure. The read-out line information is provided in the order of the first line, the second line, the third line, and so on, and sequential scanning is made possible.

FIG. 10C shows the modified embodiment derived from the previous embodiment of FIG. 10B, and it performs time compression by using only two line memories. The arrangement includes a switch 39 which reverses the state at the field (1/60 sec) interval, a field memory 41 for temporarily storing the odd-numbered field information, a field memory 42 for temporarily storing the even-numbered field information, a line memory 49 which writes the line information from the field memory 41 and reads out the information in half the write time, a line memory 50 which writes line information from the field memory 42 and reads out the information in half the write time, a double-rate scanner 18 operating at a horizontal scanning frequency of $2f_H$ (15.7 kHz×2), and a double-rate scanning display 19.

The key feature of this embodiment is the achievement of time compression for double-rate scanning by using only two line memories. The operation of the arrangement of FIG. 10C will be described sequentially. In a period of 1/60 second after the switch 39 has selected the field memory 41 in response to the detection of the frame completion identification signal, the n-th field information is written in the field memory 41. In the next 1/60 second period, the switch 39 selects the field memory 42, and the (n+1)-th field information is written into the field memory 42, while at the same time the 2nd, 4th, 6th, 8th, ..., and 524th line informations are read out sequentially and written into the line memory 50. In parallel to this operation, the 1st, 3rd, 5th, 7th, ..., and 525th line informations of the n-th field are read out sequentially and written in the line memory 49.

Information written in the line memory is read out in the order of the 1st, 2nd, 3rd, ..., and 525th lines at a speed twice the writing speed, and displayed on the display 19 in such a way that the double-rate scanner 18 operating at a horizontal scanning frequency of $2f_H$ (15.75 kHz×2) scans a frame of picture twice in a 1/30 second period.

Figure 11C:
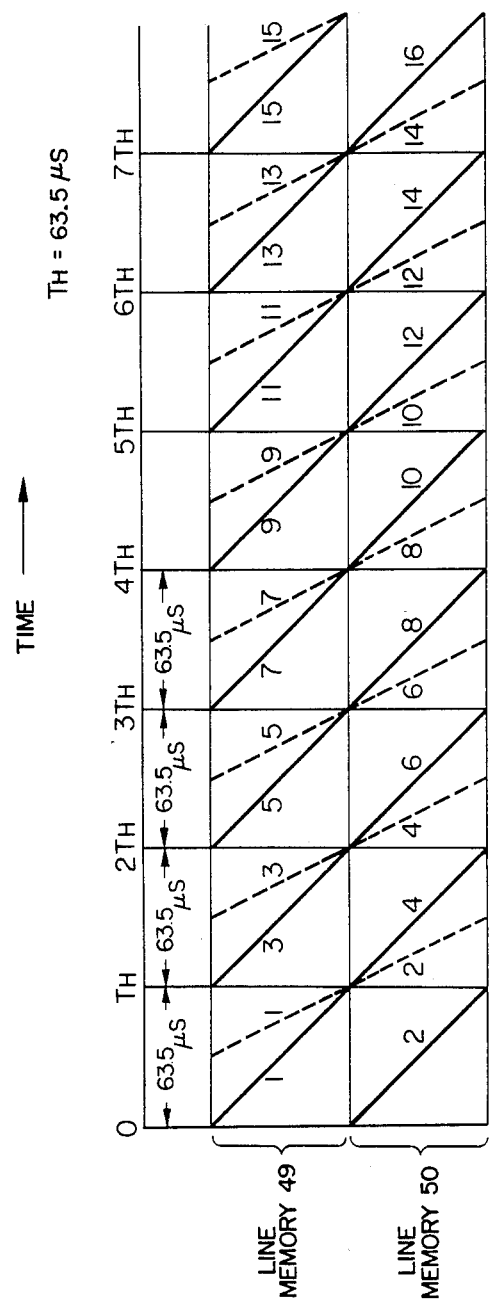
FIG. 11C is a diagram used to explain the timing of access to the line memories in the arrangement of FIG. 10C.

FIG. 11C shows the timing of access to the line memories in the arrangement of FIG. 10C. As mentioned previously, the first line and second line information is written in the line memories 49 and 50 simultaneously at time t within the range $0 \leq t < T_H$ as shown in FIG. 11C. The line memory 49 writes the line information in a $T_H$ period and then reads it out immediately, while the line memory 50 reads out the previous line information in a $T_H$ period and then writes a new line information immediately. These operations are repeated. Through the line memory access operation, the ½ time compression is accomplished by using two line memories.

The key feature of the inventive television reception system is the achievement of the time adjustment and compression in accessing field memories by using a delay circuit or line memory. As a result, the memory capacity is reduced significantly (reduced to approximately half the memory capacity of the television system of the aforementioned preceding Japanese patent application) and, at the same time, high quality pictures without crawling phenomenon or edge flicker can be obtained. Moreover, in this embodiment, the time lag of the video signal from the audio signal is completely eliminated in the transmission system and it is reduced to 1/60 second (one field period), i.e., a quarter that of the abovs-mentioned Japanese patent application, in the reception system. The result of subjective evaluation shows that a delay of picture from sound by 2/30 second (two frame period) creates an unnatural feeling in the human sense, while a delay of one field period is not noticed at all. Accordingly, this reduction of time lag in the video signal has a significant meaning.

Figure 6:
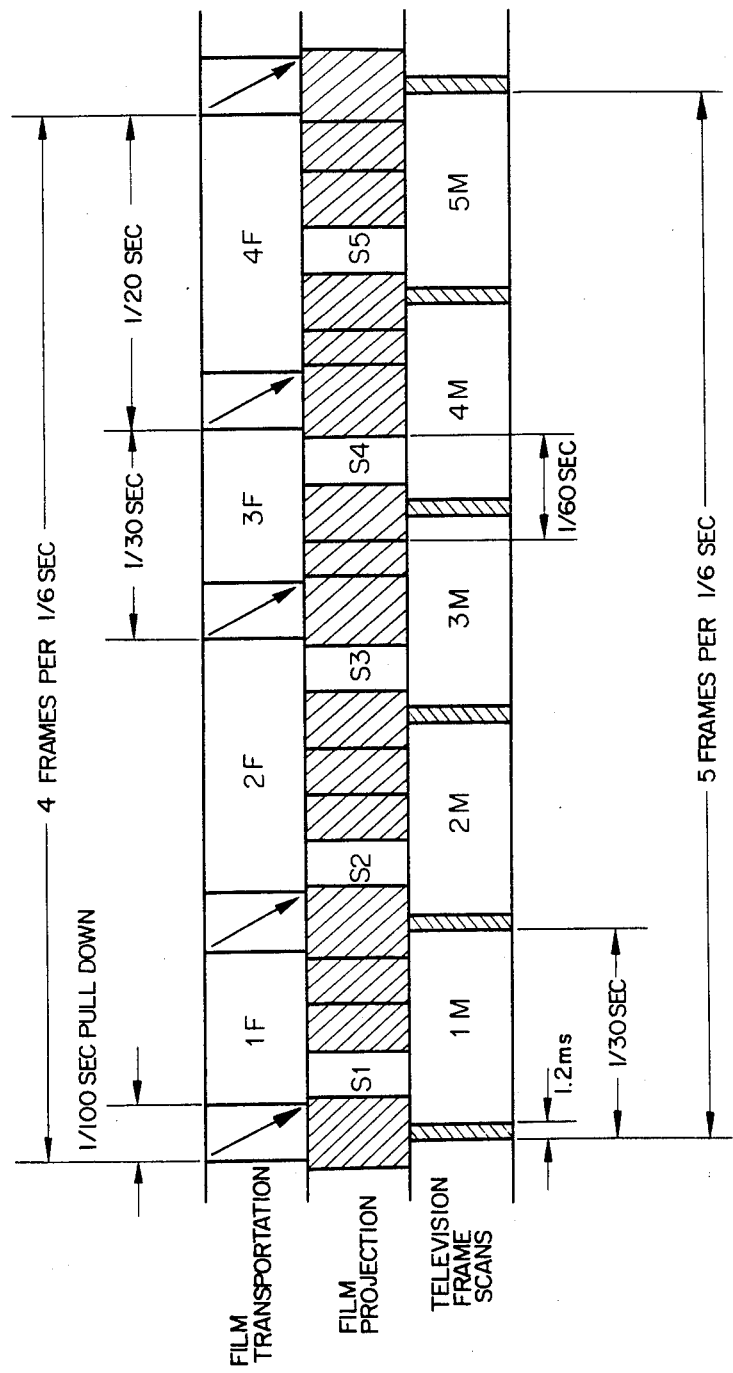
FIG. 6 is a diagram used to explain the timing relationship between the conventional 2-3 pull-down projection and the scanning operation of the television system disclosed in the above-mentioned preceding Application.

The following describes the reason why the inventive television system can solve the problems of the preceding Japanese patent application described in connection with FIG. 6 in reproducing a motion-picture film in 2–3 pull-down system. In the previous system, as shown in FIG. 6, when a frame of film is scanned by the television camera, the frame is formed into two frames of television signal, and this causes an unnatural movement of a moving image.

Figure 12:
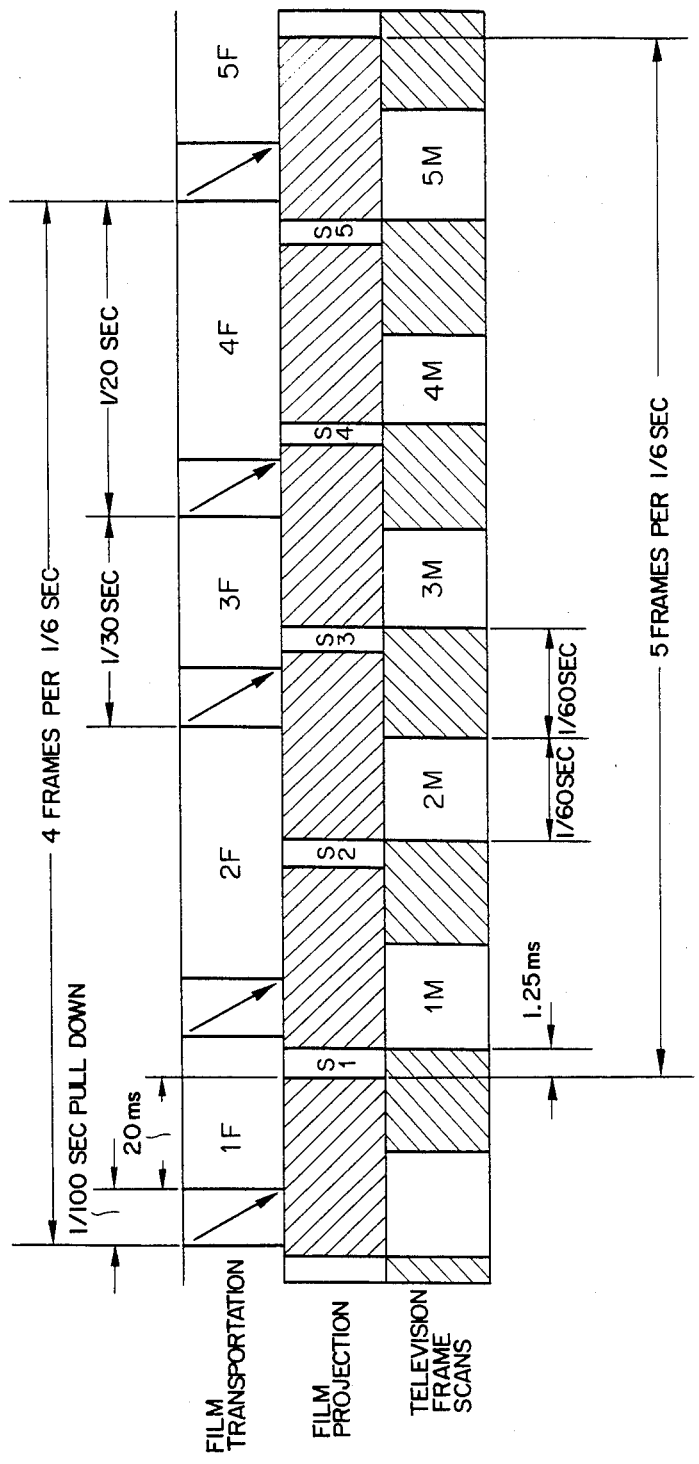
FIG. 12 is a diagram used to explain the principle of synchronous 2-3 pull-down system which is realized by application of the present invention.

By application of the inventive image sensing system, the synchronous 2-3 pull-down system can be realized as will be described in the following. FIG. 12 shows the principle of the synchronous 2-3 pull-down system which is accomplished by application of the present invention.

The principle of operation is as follows.

(a) The film projection is started after the vibration caused by transportation of the film has become completely uninfluential (20 ms after the first film transportation). Then, the film is projected at a 1/30 second interval, and the projection period does not coincide with the film transportation period.

(b) The projected picture is scanned upon completion of the projection period on 525 scanning lines in a 1/60 second period in non-interlaced scanning system.

By this film scanning operation, four frames of a motion-picture film correspond to five frames of the television signal as shown in FIG. 12. At this time, when the fourth frame 4F of the film is scanned, the same pictures of 4M and 5M are displayed successively, but in contrast to the system of the preceding Japanese patent application, the frame rate of the inventive television system is doubled to 60 Hz, and the unnatural feeling is not created even for a moving image.

The foregoing description did not mention the relation with the conventional color television signal processor for the purpose of clear understanding. The following describes an embodiment of the present invention applied to the color television system.

Three possible color television systems to which the present invention can be applied are as follows.

(a) The color television system handling three primary color signals R (red), G (green) and B (blue) individually. This system needs the circuits for three channels in both transmission and reception systems as shown in FIGS. 7 and 10.

(b) The color television system handling a luminance signal Y and differential color signals R−Y and B−Y. In this system, the primary color signals R, G and B are transformed into the Y, R−Y and B−Y signals in accordance with the equation:

$$\begin{pmatrix} Y \\ R-Y \\ B-Y \end{pmatrix} = \begin{pmatrix} +0.3 & +0.59 & +0.11 \\ +0.7 & -0.59 & -0.11 \\ -0.3 & -0.59 & +0.89 \end{pmatrix} \begin{pmatrix} R \\ G \\ B \end{pmatrix}$$

The R−Y and B−Y signals having a narrow frequency band may be compressed and transmitted intermittently in the horizontal retrace period of the Y signal as practiced conventionally.

(c) The chrominance signal system, in which the television camera incorporates an encoder for producing the composite video signal. The subcarrier frequency of the chrominance signal is selected to be $2f_{sc}$, twice the standard frequency $f_{sc}$ (3.58 MHz). The continuity of the subcarrier phase is retained in the output of the television camera K2 according to the present invention. By this arrangement, the necessary memory capacity can be reduced to as small as the capacity for one channel. In the conventional color television system, the sequence of continuous phases is expressed in terms of the scanning line number as follows: 1, 3, 5, 7, ..., 525, 2, 4, 6, 8, ..., 524.

Figures 13, 14:
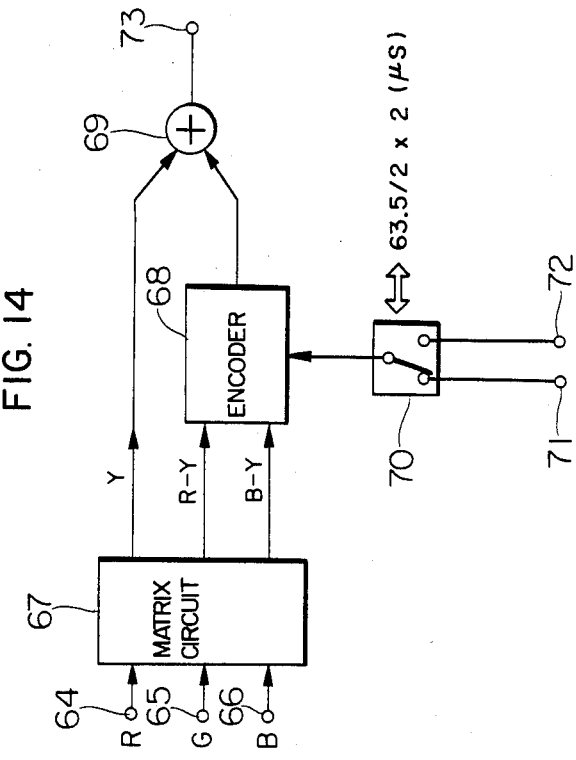
FIG. 13 is a diagram used to explain the chrominance signal system which is realized by application of the present invention.
FIG. 14 is a block diagram showing an example of the compatible encoder incorporated in the television camera in the application systems of the present invention.

The retention of continuity of the subcarrier phase is defined here as follows. When the field video signal which has been produced by sequential scanning in the order of the field number is sent out from the transmitter, the odd-numbered field is sent out first and then the even-numbered field, resulting in a discontinuity of fields in the subcarrier, and therefore the signal is processed in advance of transmission so that the subcarrier is received as a continuous field video signal. When the continuous subcarrier is received, contiguous horizontal lines are out of phase by 180 degrees with each other. According to the present invention, the camera scanning line number, transmission scanning number and subcarrier phase are arranged to have the correspondence as shown in FIG. 13. This process proposes to retain the compatibility with the conventional color television video signal by manipulating the phase of the subcarrier during the sequential scanning in the camera. FIG. 13 is read such that, for example, the transmission of scanning lines with transmission order numbers 1, 2, 3, 4, and so on signifies the transmission of scanning lines with scanning order numbers 1, 3, 5, 7, and so on, and the subcarrier phase is determined to be +, −, +, −, and so on correspondingly, thus the compatibility with the conventional color television picture signal is retained.

FIG. 14 shows one embodiment of the compatible encoder for the television camera designed in accordance with the above concept. The arrangement includes primary color signal (R,G,B) input terminals 64–66, a known matrix circuit 67, an encoder 68, an adder 69, a switch 70 which is reset at the top of each frame and switched at a 2-line (63.5/2×2 μs) interval, a positive subcarrier input terminal 71, a negative subcarrier input terminal 72, it being out of phase with the positive subcarrier by 180 degrees, and a composite picture signal output terminal 73.

The operation of the circuit will be described briefly. The matrix circuit 67 produces the Y, R−Y and B−Y signals from the primary color signals R, G and B. The differential color signals R−Y and B−Y are subjected to quadrature phase modulation by the encoder 68, with a positive subcarrier and a negative subcarrier which is out of phase with the former one by 180 degrees being provided by the switch 70 alternately at a 63.5 μs (two lines) interval. The switch 70 is reset at the beginning of each frame. The encoder output is added to the Y signal output by the adder 69, and the composite picture signal is produced.

The following describes an example of reception system which corresponds to the chrominance subcarrier system as mentioned above in item (c). A decoder of the known type for decoding the composite picture signal into the Y, R−Y and B−Y signals is disposed two places in the arrangement of FIG. 10A.

(1) Disposition of decoder(s) at the output of the tuner 11:

Three channels of decoders may be arranged for the parallel processing of the Y, R−Y and B−Y signals, or the known technique for successively transmitting the differential color signal in the retrace period of the Y signal may be used to process the principal portion in one channel.

(2) Disposition of one decoder at the output of the switch 40:

In this case, the chrominance signal is subjected to double-rate processing.

Next, the present invention as applied to still picture reproduction will be described. The inventive reception system is capable of displaying an arbitrary frame as a still picture. This can obviously be achieved merely by suspending the recording for successive frame information.

The fourth application of the present invention is the video disk system. As is known in the field of art, an optical video disk records one frame of picture at each revolution of the disk. The television signal produced by the inventive system can be recorded and then reproduced on the video disk. In this case, the form of the discrimination signal of the present invention as mentioned earlier may be substituted by a known code form used in the conventional video disk system.

According to the present invention, noticeable scanning lines caused by the crawling phenomenon, which has been a problem of the conventional television broadcasting system, can be alleviated, and improvement of picture quality such as alleviation of degraded vertical resolution and elimination of edge flicker in displaying a moving image can be achieved. Moreover, the memory capacity can be reduced to approximately a quarter in the transmission system and to approximately half in the reception system as compared with the television system set forth in the above-mentioned preceding Japanese patent application. That is, the memory capacity of the whole system can be reduced to approximately $\frac{1}{3}$, and it is very advantageous economically. The inventive system further makes practically unnoticeable the time lag of the displayed picture from the sound, and the realization of the synchronous pull-down system allows for the compatibility of receiving all types of video signals by the conventional common television set and also by the high picture quality television receiver set forth in the above-mentioned preceding Japanese patent application.

The present invention can of course be extended to the color television system as described in the application of the embodiment.

We claim:

1. A television system including a transmission system in which a picture information signal produced by scanning an image is transmitted by a transmitter, and a reception system in which the transmitted signal is received by a tuner and applied to a scanning display means to display the image, wherein said transmission system comprises:
    an image pickup device which scans said image at a predetermined horizontal scanning frequency with non-interlacing line-by-line scanning and produces a plurality of frame information signals, each constituted by a predetermined number of line information signals, at a predetermined frame rate;
    first switch means which separates each of selected ones of said frame information signals provided by said image pickup device into a first field information signal comprising odd-numbered ones of the line information signals and a second field information signal comprising even-numbered ones of the line information signals, said odd-numbered and even-numbered line information signals being alternately outputted from said first switch means at the horizontal scanning frequency;
    first memory means for storing each of said odd-numbered line information signals of said first field information signal provided by said first switch means, said first memory means having a storage capacity for storing at least one of said odd-numbered line information signals;
    second memory means for storing each of said even-numbered line information signals of said second field information signal provided by said first switch means, said second memory means having a storage capacity for storing at least said second field information signal; and
    second switch means for alternately reading out the first and second field information signals that are stored in said first and second memory means during respective first and second frame periods and providing said read-out of first and second field information signals to said transmitter for transmission as said picture information signal in the form of interlaced field information signals;

said reception system comprising:
field identification means, connected to said tuner to receive said picture information signal, for identifying said first and second field information signals constituting said picture information signal and providing an identification signal;
third switch means connected to the output of said tuner, for receiving the picture information signal and in response to said identification signal for alternately providing the first field information signal by switching said third switch means into one operating state and the second field information signal of said received picture information signal by switching said third switch means into another operating state;
third memory means connected to receive said first field information signal from said third switch means for storing said first field information signal during a third frame period;
fourth memory means connected to receive said second field information signal from said third switch means for storing said second field information signal during a fourth frame period;
read-out means for alternately reading out the line information signals of said first and second field information signals from said third and fourth memory means, respectively, substantially during a fifth frame period and comprising fourth switch means for reading out the first field information signal from said third memory means and having two output terminals on which respective odd-numbered line information signals of said first field information signal are alternately outputted at half said horizontal scanning frequency, fifth memory means having two line memories for alternately storing respective odd-numbered line information signals of the first field information signal provided from said two output terminals of said fourth switch means into said two line memories, fifth switch means for alternately connecting said two line memories at half said horizontal scanning frequency and reading out said line information signals from said two line memories at said horizontal scanning frequency, sixth switch means having two output terminals for reading out the second field information signal from said fourth memory means and alternately outputting from said two output terminals respective even-numbered line information signals at half said horizontal scanning frequency, sixth memory means having two line memories for alternately storing said respective even-numbered line information signals provided from said two output terminals of said sixth switch means into said two line memories of said sixth memory means, and seventh switch means for alternately connecting to said two line memories of said sixth memory means and for reading out said line information signals from said two line memories of said sixth memory means at said horizontal scanning frequency; and a scanner connected to receive the line information signals read out by said read-out means of said display device at said predetermined horizontal scanning frequency with non-interlacing.

2. A television system including a transmission system in which a picture information signal produced by scanning an image is transmitted by a transmitter, and a reception system in which the transmitted signal is received by a tuner and applied to a scanning display means to display the image, wherein said transmission system comprises:

an image pickup device which scans said image at a predetermined horizontal scanning frequency with non-interlacing line-by-line scanning and produces a plurality of frame information signals, each constituted by a predetermined number of line information signals, at a predetermined frame rate;

first switch means which separates each of selected ones of said frame informaiton signals provided by said image pickup device into a first field information signal comprising odd-numbered ones of the line information signals and a second field information signal comprising even-numbered ones of the line information signals, said odd-numbered and even-numbered line information signals being alternately outputted from said first switch means at the horizontal scanning frequency;

first memory means for storing each of said odd-numbered line information signals of said first field information signal provided by said first switch means, said first memory means having a storage capacity for storing at least one of said odd-numbered line information signals;

second memory means for storing each of said even-numbered line information signals of said second field information signal provided by said first switch means, said second memory means having a storage capacity for storing at least said second field information signal; and second switch means for alternately reading out the first and second field information signals that are stored in said first and second memory means during respective first and second frame periods and providing said read-out of first and second field information signals to said transmitter for transmission as said picture informaiton signal in the form of interlaced field information signals;

said reception system comprising:

field identification means, connected to said tuner to receive said picture information signals, for identifying said first and second field information signals constituting said picture information signal and providing an identification signal;

third switch means connected to the output of said tuner, for receiving the picture information signal and in response to said identification signal for alternately providing the first field information signal by switching said third switch means into one operating state and the second field information signal of said received picture information signal by switching said third switch means into another operating state;

third memory means connected to receive said first field informatin signal from said third switch means for storing said first field information signal during a third frame period;

fourth memory means connected to receive said second field information signal from said third switch means for storing said second field information signal during a fourth frame period;

read-out means for alternately reading out the line information signals of said first and second field information signals from said third and fourth memory means, respectively, substantially during a fifth frame period and comprising first line memory means for storing odd-numbered line information signals of the first field information signal read out from said third memory means at half the horizontal scanning frequency and outputting the respective odd-numbered line information signals at the horizontal scanning frequency, and second line memory means for storing the even-numbered line information signals of the second field information signal read out from said fourth memory means at half the horizontal scanning frequency and outputting the respective even-numbered line information signals at the horizontal scanning frequency; and a scanner connected to receive the line information signals read out by said read-out means of said display device at said predetermined horizontal scanning frequency with non-interlacing.

3. A television reception system comprising:

tuner means for receiving a transmitted picture information signal constituted by first and second field information signals each formed of a predetermined number of line information signals occurring at a predetermined horizontal scanning frequency;

field identification means connected to said tuner means to receive said picture information signal, for identifying said first and second field information signals constituting said picture information signal and providing an identification signal;

first switch means connected to the output of said tuner means, for receiving said picture information signal and in response to said identification signal for alternately providing the first field information signal by switching said first switch means into one operating state and the second field information signal by switching said first switch means into another operating state;

first memory means, operatively connected to said first switch means, for receiving said first field information signal in the form of odd-numbered line information signals from said first switch means and for storing it during a first field period;

second memory means operatively connected to said first switch means for receiving said second field information signal in the form of even-numbered line information signals from said first switch means and for storing it during a second field period;

read-out means for alternately reading out the line information signals of said first and second field information signals from said first and second memory means substantially during a third field period and comprising second switch means for reading out the first field information signal from said first memory means, said second switch means having two output terminals and alternately outputting from said two output terminals said line information signals at said horizontal scanning frequency, third memory means having two line memories for alternately storing respective odd-numbered line information signals of the first field information signal provided from said two output terminals of said second switch means into said two line memories, third switch means for alternately connecting said two line memories at said horizontal scanning frequency and reading out each of said line information signals from said two line memories in a half period of the one line scanning, fourth switch means having two output terminals for reading out the second field information signal from said second memory means and alternately outputting from said two output terminals respective even-numbered line information signals at said horizontal scanning frequency, fourth memory means having two line memories for alternately storing said respective even-numbered line information signals of the second field information signal provided from said two output terminals of said fourth switch means into said two line memories of said fourth memory means, and fifth switch means for alternately connecting to said two line memories of said fourth memory means at said horizontal scanning frequency and reading out each of said line information signals from said two line memories of said fourth memory means in a half period of the one line scanning; and a scanner which receives the field information signals read out by said read-out means and applies said signals to a display device at twice said predetermined horizontal scanning frequency with non-interlacing in line scanning.

4. A television reception system comprising:

tuner means for receiving a transmitted picture information signal constituted by first and second field information signals each formed of a predetermined number of line information signals occurring at a predetermined horizontal scanning frequency;

field idetification means connected to said tuner means to receive said picture information signal, for identifying said first and second field information signals constituting said picture information signal and providing an identification signal;

first switch means connected to the output of said tuner means, for receiving said picture information signal and in response to said idetification signal for alternately providing the first field information signal by switching said first switch means into one operating state and the second field information signal by switching said first switch means into another operating state;

first memory means, operatively connected to said first switch means, for receiving said first field information signal in the form of odd-numbered line information signals from said first switch means and for storing it during a first field period;

second memory means operatively connected to said first switch means for receiving said second field information signal in the form of even-numbered line information signals from said first switch means and for storing it during a second field period;

read-out means for alternately reading out the line information signals of said first and second field information signals from said first and second memory means substantially during a third field period and comprising first line memory means for storing said odd-numbered line information signals of the first field information signal read out from said first memory means in a period of one line scanning and outputting the respective odd-numbered line information signals in a half period of one line scanning, and second line memory means for storing said even-numbered line information signals of the second field information signal read out from said second memory means in a period of one line scanning and outputting the respective even-numbered line information signals in a half period of one line scanning; and a scanner which receives the field information signals read out by said read-out means and applies said signals to a display device at twice said predetermined horizontal scanning frequency with non-interlacing in line scanning.

* * * * *